US010687255B2

(12) United States Patent
Fukui et al.

(10) Patent No.: US 10,687,255 B2
(45) Date of Patent: Jun. 16, 2020

(54) BEAM TRANSMISSION/RECEPTION METHOD, BASE STATION, TERMINAL, AND WIRELESS COMMUNICATION SYSTEM

(71) Applicant: MITSUBISHI ELECTRIC CORPORATION, Tokyo (JP)

(72) Inventors: Noriyuki Fukui, Tokyo (JP); Keijiro Take, Tokyo (JP); Atsushi Okamura, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/327,579

(22) PCT Filed: Oct. 6, 2016

(86) PCT No.: PCT/JP2016/079774
§ 371 (c)(1),
(2) Date: Feb. 22, 2019

(87) PCT Pub. No.: WO2018/066103
PCT Pub. Date: Apr. 12, 2018

(65) Prior Publication Data
US 2019/0223058 A1    Jul. 18, 2019

(51) Int. Cl.
*H04W 16/28* (2009.01)
*H04W 36/00* (2009.01)
(Continued)

(52) U.S. Cl.
CPC ........ *H04W 36/0016* (2013.01); *H04B 17/21* (2015.01); *H04W 16/28* (2013.01);
(Continued)

(58) Field of Classification Search
CPC . H04W 36/0016; H04W 74/08; H04W 48/10; H04W 36/00; H04W 16/28; H04W 36/00837; H04W 36/0088
See application file for complete search history.

(56) References Cited

U.S. PATENT DOCUMENTS

2004/0014429 A1 * 1/2004 Guo ..................... H04B 7/0632
455/73
2016/0100347 A1    4/2016 Ryu et al.
(Continued)

FOREIGN PATENT DOCUMENTS

JP    11-331065 A    11/1999
JP    2015-185914 A    10/2015

OTHER PUBLICATIONS

German Office Action for German Application No. 112016007196.5, dated Jan. 4, 2020, with English translation.

*Primary Examiner* — Lan-Huong Truong
(74) *Attorney, Agent, or Firm* — Birch, Stewart, Kolasch & Birch, LLP.

(57) ABSTRACT

Provided is a beam transmission/reception method, which is executed in a wireless communication system in which a terminal and a base station are configured to use a beam to communicate to and from each other. The beam transmission/reception method includes a first step of setting, by the base station, when receiving a random access signal transmitted by the terminal as a connection request, a beam direction group at a time of reception of the random access signal by adding a further outer beam direction to beam directions used at a time of transmission of a notification signal for measuring a signal before the reception.

16 Claims, 11 Drawing Sheets

BEAM DIRECTION DURING RECEPTION OF RACH SIGNAL

(51) Int. Cl.
*H04W 74/08* (2009.01)
*H04W 48/10* (2009.01)
*H04B 17/21* (2015.01)

(52) U.S. Cl.
CPC ....... *H04W 36/00* (2013.01); *H04W 36/0088* (2013.01); *H04W 36/00837* (2018.08); *H04W 48/10* (2013.01); *H04W 74/08* (2013.01)

(56) References Cited

U.S. PATENT DOCUMENTS

2016/0212631 A1* 7/2016 Shen .................. H04W 56/001
2017/0111850 A1* 4/2017 Okasaka ............... H04W 16/28

* cited by examiner

BEAM DIRECTION DURING TRANSMISSION OF
NOTIFICATION SIGNAL

BEAM DIRECTION DURING RECEPTION OF RACH SIGNAL

WHEN MOVEMENT DISTANCE IS DETERMINED TO BE SMALL

WHEN MOVEMENT DISTANCE IS DETERMINED TO BE LARGE

BEAM DIRECTION DURING TRANSMISSION OF NOTIFICATION SIGNAL

BEAM DIRECTION DURING RECEPTION OF RACH SIGNAL

BEAM TRANSMISSION/RECEPTION METHOD, BASE STATION, TERMINAL, AND WIRELESS COMMUNICATION SYSTEM

TECHNICAL FIELD

The present invention relates to a beam transmission/reception method in which communication is held between one or more base stations forming a communication service area and one or more terminals present in each communication service area, a base station, a terminal, and a wireless communication system.

BACKGROUND ART

There is a technology with which, in communication between a base station and a terminal, the base station sends a signal by forming a beam (beam forming) only in the direction of the communication destination terminal with the use of a plurality of antennas. This technology enables the base station to limit the direction in which a wireless signal travels. Interference with another terminal located in another place can consequently be prevented or reduced.

In addition, the transmission of a wireless signal in a specific direction makes electric power for transmission concentrated compared to when a signal is transmitted to the entire service area, and the concentration can be utilized to lengthen the distance covered by the signal.

This beam forming is applicable also when a base station receives a wireless signal from a terminal. Specifically, by giving wireless signal reception directivity to a reception antenna of a base station, the influence of interference waves arriving from other directions than the direction of the reception directivity can be prevented or reduced.

However, as described above, a single beam, which has been formed in a specific direction (beam direction) through application of beam forming, is transmitted in only the beam direction and received from only the beam direction, and thus it is necessary to direct the beam direction in a plurality of directions in order to cover the entire service area of one base station. FIG. 11 is an explanatory diagram about a base station whose service area is established with the use of a plurality of beam directions. Switching from one beam direction to a plurality of beam directions, using a plurality of beams directed in different directions, or using a combination thereof is conceivable as a method of directing the beam in the plurality of directions.

In initial connection to start communication, a terminal first searches for a base station with which a signal quality high enough to hold communication is obtained. The terminal also conducts a search for nearby base stations, excluding a base station with which the terminal is currently holding communication, when what is called handover takes place in which the terminal switches from the current communication partner base station to another base station.

FIG. 12 is an explanatory diagram for illustrating a sequence of general handover in a wireless communication system in which beam forming is not used. A terminal detects quality deterioration in a signal communicated to and from a base station (communication partner base station) with which the terminal is currently holding communication. The terminal then receives notification signals transmitted from nearby base stations and measures quality of the notification signals, and sends a report on the result of the measurement to the current communication partner base station, along with a handover request.

When receiving the report, the current communication partner base station determines one of nearby base stations with which a signal quality high enough to hold communication is obtained, and requests the determined nearby base station to accept handover. The requested nearby base station sends a response informing of its acceptance to the current communication partner base station when the requested nearby base station is available for handover.

The current communication partner base station receives the response informing of the availability for handover, and transmits a handover execution command to the terminal along with information (a base station ID and the like) about the nearby base station that is the handover destination.

The terminal receives the handover execution command and transmits a random access (hereinafter referred to as "RACH signal") as a communication request to the handover destination nearby base station. The nearby base station detects the RACH signal, and returns a random access response to the terminal to start communication.

Information about timing at which a base station can receive a RACH signal is normally contained in the base station's notification signal. The terminal can accordingly find out the RACH signal reception timing of the base station from the notification signal, and transmits a RACH signal according to the reception timing.

One of or all of the following information and signals are referred to herein as "notification signal".

A synchronization signal required for a terminal to synchronize with a base station in frequency and time, and containing the identifier of the base station (a base station ID)

A reference signal for measuring the quality of a signal from a base station (also called a pilot signal)

Minimum information required for a terminal to establish communication to a base station, for example, information about a frequency used by the base station to receive a RACH signal and RACH signal reception timing of the base station A method of establishing initial connection in a system using the beam forming technology is disclosed in the related art (see Patent Literature 1, for example). In Patent Literature 1, one base station transmits a signal (search signal) for a terminal to search for the base station by sequentially changing the beam direction. The terminal receives the search signal to detect the base station, and transmits a RACH signal to the detected base station.

At this time, the base station changes a beam direction in which the search signal is to be transmitted at certain timings, and changes a beam direction in which the RACH signal is to be received as well. Accordingly, a timing at which the transmission beam of the search signal is directed in one beam direction and a timing at which the reception beam of the RACH signal is directed in the same direction have a correspondence relationship, and the search signal contains information about the timing of receiving a corresponding RACH signal.

On the basis of the descriptions of paragraphs [0048] to [0052] of Patent Literature 1, the beam direction used for transmitting a search signal and the beam direction used for receiving a RACH signal are considered to be the same direction.

It is also disclosed in Patent Literature 1 that, when a base station can form a plurality of beams simultaneously, RACH signals are received at the same reception timing by forming beams in a plurality of directions. With regard to the combination of a plurality of beams, it is only mentioned in Patent Literature 1 that a combination high in orthogonality is selected. It is also described in Patent Literature 1 that the same concept is applied to handover.

CITATION LIST

Patent Literature

[PTL 1] JP 2015-185914 A

SUMMARY OF INVENTION

Technical Problem

The related art, however, has the following problems:

There is a lapse of time since a terminal receives a notification signal of a nearby base station till the terminal transmits a RACH signal. The terminal may have moved during the lapse of time. Accordingly, with the method described in Patent Literature 1 alone, the optimum beam direction from a base station toward a terminal may change during a period from when the terminal measures a signal from the nearby base station till when the terminal transmits a RACH signal.

While it is described in Patent Literature 1 that a plurality of beams are formed at the same timing, the only mention made in Patent Literature 1 with regard to the combination of beam directions is that beams orthogonal to each other are combined. Also in this case, in Patent Literature 1, the beam direction used for transmitting a notification signal (corresponding to search signal in Patent Literature 1) and the beam direction for receiving a RACH signal are considered to be the same.

As described above, the terminal identifies an optimum beam direction from a result at the time when a notification signal is received from a nearby base station, and transmits a RACH signal at the time when the nearby base station directs a beam in the optimum beam direction to receive the RACH signal. However, when the terminal has already moved out of an area covered by a beam for RACH signal reception, the move causes a problem in that the nearby base station fails to properly receive a RACH signal transmitted from the terminal at the time when the nearby base station directs the beam for RACH signal reception to the optimum beam direction.

In particular, when the optimum beam direction specified by the terminal is a beam direction present along an edge of the service area, and the terminal transmits a RACH signal, the terminal may be out of the service area. In this case, there may occur a problem in that even when the base station tries to use a plurality of beams to receive a RACH signal, the base station fails to correctly receive the RACH signal as long as the same beam direction is used for transmission of a notification signal and reception of a RACH signal.

FIG. 13 is a diagram for illustrating a base station capable of radiating beams in 16 beam directions at the same time by covering the service area with 32 beam directions. The base station illustrated in FIG. 13 transmits a notification signal in 16 different directions at each of two different timings. Further, the base station illustrated in FIG. 13 receives a RACH signal from 16 different directions at each of two different timings.

In this case, the beam direction specified by the terminal is "specific beam" in FIG. 13. When the terminal has moved in a direction indicated by FIG. 13 at the time of transmission of a RACH signal, the base station fails to correctly receive the RACH signal.

The same problem occurs also when a base station currently holding communication to and from a terminal to be handed over and receiving a report on a measurement result from the terminal determines a handover destination base station and a handover destination beam direction by applying the example of FIG. 12 in addition to Patent Literature 1. Further, in addition to the case of handover, a RACH signal is also required to be transmitted/received at the time of initial connection to the base station by the terminal, resulting in a similar problem. The handover destination beam direction is a direction in which a nearby base station directs a beam when the nearby base station receives a RACH signal transmitted by the terminal for handover. When the terminal receives a notification signal transmitted by the nearby base station before execution of handover, the terminal receives the notification signal transmitted through each of a plurality of beams, and the communication base station can determine the handover destination beam direction based on the result of reception.

The present invention has been made to solve the problems described above, and an object of the present invention is therefore to provide a beam transmission/reception method, a base station, a terminal, and a wireless communication system, which are capable of executing initial connection or handover more reliably than in the related art by preventing occurrence of a state in which a RACH signal cannot be received from a moving terminal at the time of initial connection or handover.

Solution to Problem

A beam transmission/reception method according to one embodiment of the present invention is a beam transmission/reception method, which is executed in a wireless communication system in which a terminal and a base station are configured to use a beam to communicate to and from each other, the beam transmission/reception method including a first step of setting, by the base station, when receiving a random access signal transmitted by the terminal as a connection request, a beam direction group at a time of reception of the random access signal by adding a further outer beam direction to beam directions used at a time of transmission of a notification signal for measuring a signal before the reception.

Further, abase station according to one embodiment of the present invention is a base station, which is applied to a wireless communication system in which a beam is used for communication to and from a terminal, the base station including a controller configured to perform beam direction control by setting, when receiving a random access signal transmitted by the terminal as a connection request, a beam direction group at a time of reception of the random access signal by adding a further outer beam direction to beam directions used at a time of transmission of a notification signal for measuring a signal before the reception.

Further, a terminal according to one embodiment of the present invention is a terminal, which is applied to a wireless communication system in which a beam is used for communication to and from a base station, the terminal including a controller configured to identify, when receiving a notification signal contained in one or more beam directions from the base station, a beam direction determined to be appropriate for connection among the one or more beam directions to generate third information, and transmit the third information to the base station.

In addition, a wireless communication system according to one embodiment of the present invention is a wireless communication system including a terminal and a base station, which are configured to use a beam to communicate to and from each other, wherein the terminal is configured to, when the base station includes a communication base station communicating to and from the terminal and a nearby base station configured to serve as a handover destination candidate: generate, when detecting deterioration in signal quality between the terminal and the communication base station, a handover request including a result of measuring a notification signal transmitted by the nearby base station, and notify the communication base station of the handover request; and transmit, when receiving from the communication base station a handover execution command including information on the nearby base station serving as a handover destination as a response to the handover request, a random access signal serving as a connection request to the nearby base station serving as the handover destination, and wherein the nearby base station serving as the handover destination is configured to set, when receiving the random access signal from the terminal, a beam direction group at a time of reception of the random access signal by adding a further outer beam direction to beam directions used at a time of transmission of the notification signal before the reception.

Advantageous Effects of Invention

According to the embodiments of the present invention, there is provided a configuration of using, at the time of reception of the RACH signal by the base station, a further outer beam direction than the beam directions used at the time of transmission of the notification signal before reception of the RACH signal, as a combination of a plurality of beam directions. As a result, it is possible to obtain the beam transmission/reception method, base station, terminal, and wireless communication system, which are capable of executing the initial connection or handover more reliably than in the related art by preventing a state in which a RACH signal cannot be received from a moving terminal at the time of initial connection or handover.

DESCRIPTION OF EMBODIMENTS

A beam transmission/reception method, a base station, a terminal, and a wireless communication system according to a preferred embodiment of the present invention are described below with reference to the drawings.

First Embodiment

Figure 1A:
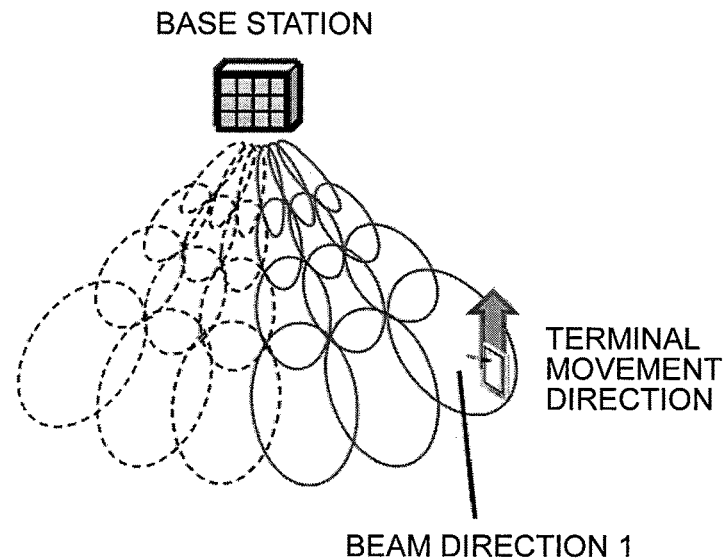
FIG. 1A is a diagram for illustrating a beam direction group at a time of transmission of a notification signal by a base station in a first embodiment of the present invention.

A beam transmission/reception method according to a first embodiment of the present invention has a technical feature in that a beam direction facing toward an outer side of a service area compared to a beam direction at a time of transmission of a notification signal is used as a beam direction at a time of reception of a RACH signal (connection request). FIG. 1A is a diagram for illustrating a beam direction group at a time of transmission of a notification signal by a base station in the first embodiment of the present invention. The beam direction group herein refers to a group containing one or more beam directions grouped under a certain condition, and in FIG. 1A, indicates a group of beam directions in which a notification signal is to be transmitted at the same timing. Further, FIG. 1B is a diagram for illustrating a beam direction group at a time of reception of a RACH signal by the base station in the first embodiment of the present invention.

Figure 1B:
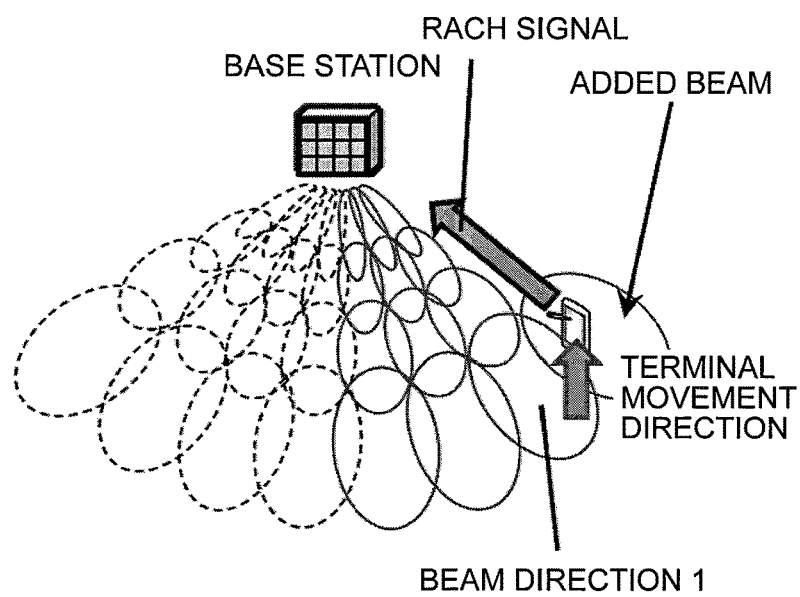
FIG. 1B is a diagram for illustrating a beam direction group at a time of reception of a RACH signal by the base station in the first embodiment of the present invention.

In each of FIG. 1A and FIG. 1B, a plurality of directions depicted by the solid lines belong to one group to be used at the same time, and a plurality of directions depicted by the dotted lines belong to another group. The beam direction at the time of reception of a RACH signal illustrated in FIG. 1B includes an added beam direction facing toward an outer side of a service area of the base station compared to a beam direction at the time of transmission of a notification signal illustrated in FIG. 1A.

The terminal receives a notification signal, and determines an appropriate beam direction. Now, it is assumed that the beam direction determined by the terminal is a beam direction 1 illustrated in FIG. 1A. In this case, the terminal may move before later transmission of a RACH signal, and move out of an area in the beam direction 1.

Under such a situation, when the beam direction at the time of reception of a RACH signal is the same as the beam direction at the time of transmission of a notification signal, the base station may not receive the RACH signal. However, in the first embodiment, as illustrated in FIG. 1B, a reception method involving using a beam direction facing toward the outer side of the service area formed at the time of transmission of a notification signal is adopted at the time of reception of a RACH signal. As a result, the beam transmission/reception method according to the first embodiment of the present invention enables reliable reception of the RACH signal.

Now, it is assumed that the base station for forming a beam is notified in advance of the beam direction specified by the terminal. In this case, when the beam direction specified by the terminal is along an edge of the service area formed at the time of transmission of a notification signal, the base station uses a further outer beam at the time of reception of a RACH signal as illustrated in FIG. 1B.

On the other hand, when the beam direction specified by the terminal is not along the edge of the service area formed at the time of transmission of a notification signal, the base station is not required to use a further outer beam at the time of reception of a RACH signal.

Further, now, it is assumed that the base station for forming a beam is not notified in advance of the beam direction specified by the terminal. In this case, the base station always uses a further outer beam at the time of reception of a RACH signal as illustrated in FIG. 1B.

In handover, the terminal can give a handover request and notify the communication base station of information on the specific beam direction at the same time. Thus, the communication base station can notify a nearby base station serving as a handover destination of the information received from the terminal. As a result, the nearby base station, which has received this notification from the communication base station, can perform an operation of using a further outer beam as described above at the time of reception of a RACH signal depending on the specific beam direction.

Further, the terminal cannot notify the base station of the beam direction specified in advance at an initial connection operation of starting communication under a state in which the terminal is connected to no base station. Thus, a base station that receives a RACH signal of such a terminal is always required to use a further outer beam at the time of reception of a RACH signal as illustrated in FIG. 1B.

Now, it is assumed that the terminal is connected to one base station, and is trying to perform an operation of connecting to another base station. In such a case, when the first base station and the second base station have a function of exchanging information with each other, the beam direction specified by the terminal among beams generated by the first base station can be notified to the second base station in advance.

The base station can calculate a movement distance by which the terminal may move based on a movement speed of the terminal performing a connection operation and a time difference between a time of measurement of a notification signal and a time of transmission of a RACH signal by the terminal at the connection operation. Further, the base station can determine a position to be irradiated with an outer beam to be added based on the calculation result. The base station can acquire information on the movement speed of the terminal through notification by the terminal. Further, the time of transmission of a RACH signal by the terminal is the same as a time of reception of the RACH signal by the base station, which is determined by the base station every time a connection operation is performed. The base station calculates the above-mentioned movement distance and notifies the terminal performing a connection operation of the movement distance.

Figure 2A:
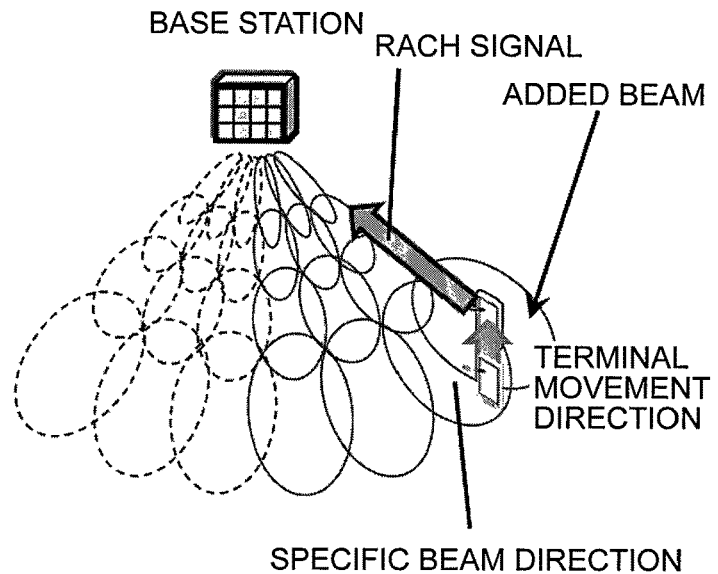
FIG. 2A is a diagram for illustrating a beam direction group at the time of reception of the RACH signal by the base station in a case where a movement distance is determined to be small in the first embodiment of the present invention.
Figure 2B:
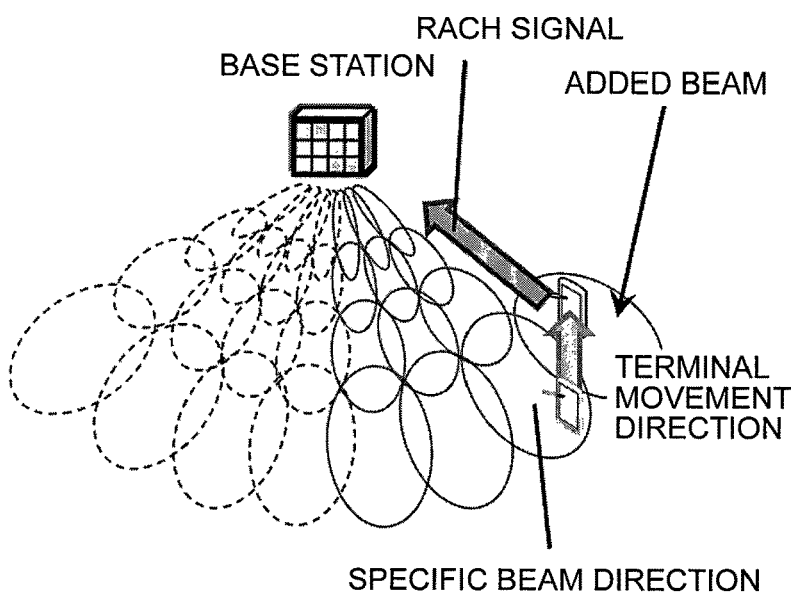
FIG. 2B is a diagram for illustrating a beam direction group at the time of reception of the RACH signal by the base station in a case where the movement distance is determined to be large in the first embodiment of the present invention.

FIG. 2A is a diagram for illustrating a beam direction group at the time of reception of the RACH signal by the base station in a case where a movement distance is determined to be small in the first embodiment of the present invention. On the other hand, FIG. 2B is a diagram for illustrating a beam direction group at the time of reception of the RACH signal by the base station in a case where a movement distance is determined to be large in the first embodiment of the present invention.

As illustrated in FIG. 2A, when the calculated movement distance is small, the base station can set an outer beam to be added at a position close to a specific beam direction, and radiate the added outer beam. On the other hand, as illustrated in FIG. 2B, when the calculated movement distance is large, the base station can set the outer beam to be added at a position away in the specific beam direction, and radiate the added outer beam.

In the above, a description has been given on the assumption that the movement distance of the terminal is different for each connection operation. However, when the maximum movement speed supported by the base station is always fixed for different terminals and a time difference between a notification signal measurement time and a RACH signal transmission time is determined in advance in a fixed manner, the base station can also determine a position to be irradiated with the added beam in a fixed manner in advance. In that case, for example, the base station determines an angle difference in a direction of obtaining the maximum gain for adjacent beams as $\theta°$. The base station can determine the angle $\theta°$ based on the maximum movement speed of a supported terminal and the maximum movement distance of the terminal determined based on the time difference between the notification signal measurement time and the RACH signal transmission time of the terminal determined in advance.

Figure 3:
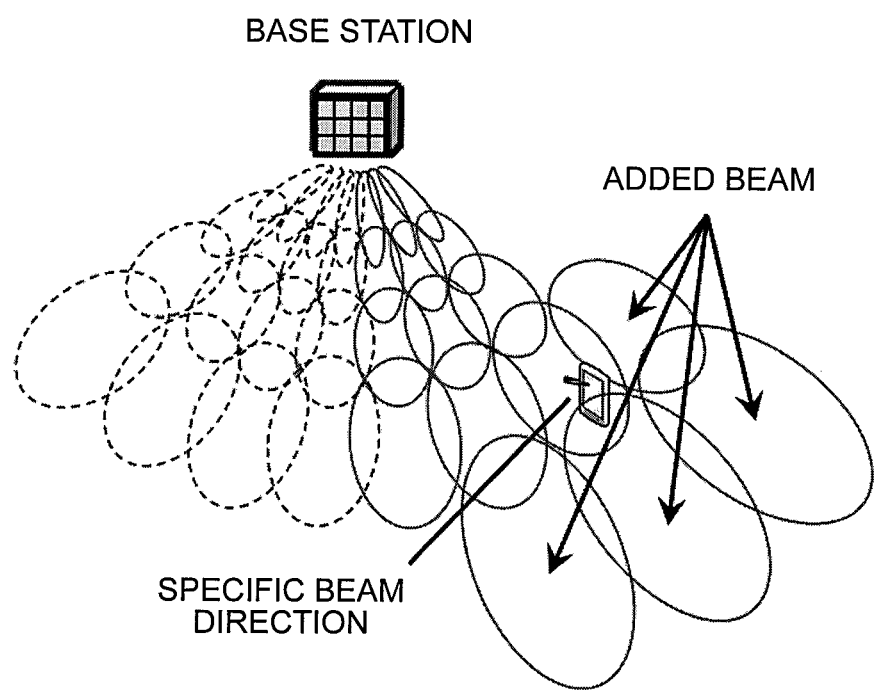
FIG. 3 is a diagram for illustrating an additional beam at the time of reception of the RACH signal by the base station in the first embodiment of the present invention.

Further, when the movement direction of the terminal is known to the base station, the base station may add one beam as illustrated in FIG. 1 and FIG. 2 in the movement direction. On the other hand, when the base station cannot know the movement direction of the terminal, the base station can add beams in a plurality of directions without adding only one beam. FIG. 3 is a diagram for illustrating an additional beam at the time of reception of the RACH signal by the base station in the first embodiment of the present invention.

Figure 4:
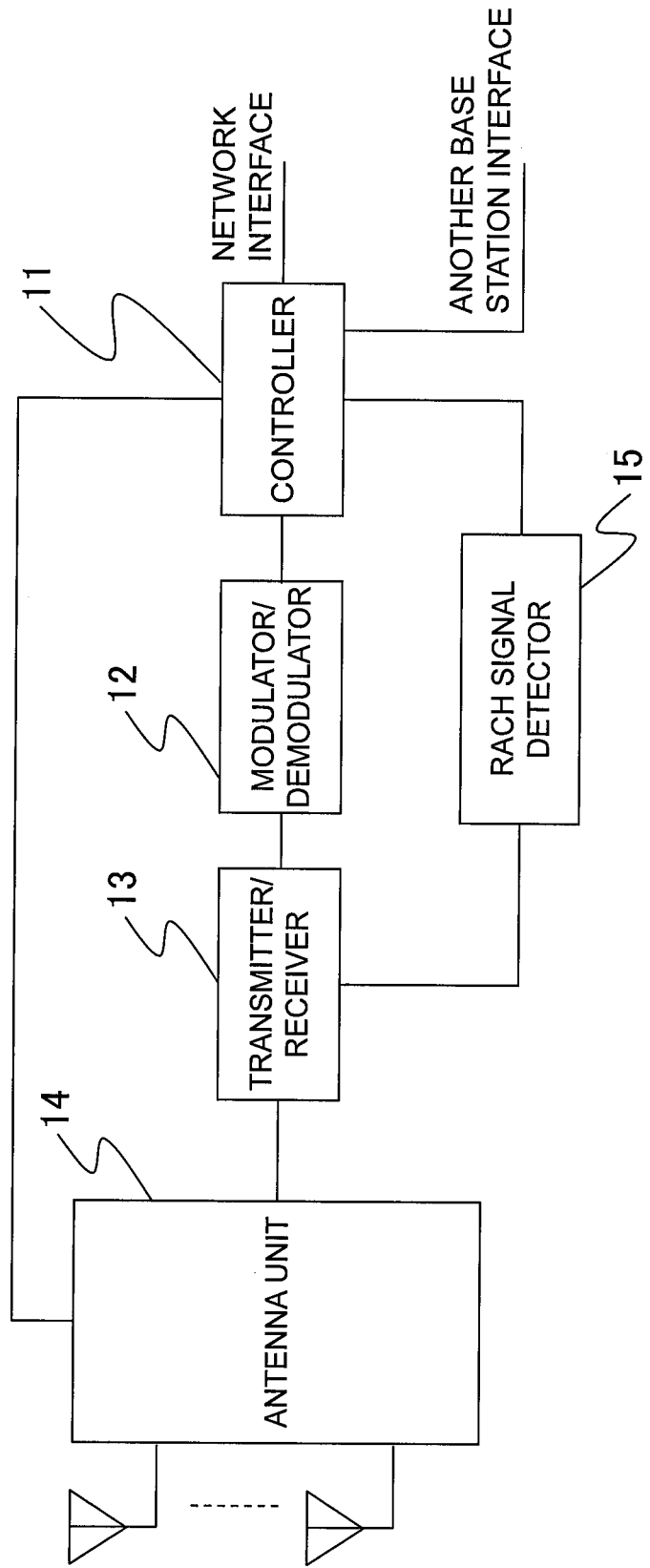
FIG. 4 is a diagram for illustrating a configuration of a base station according to the first embodiment of the present invention.

FIG. 4 is a diagram for illustrating a configuration of a base station according to the first embodiment of the present invention. A controller 11 receives, during communication, data destined to terminals and arriving from a network to which the base station is connected. The controller 11 manages, for each terminal, the timing of transmitting data to the terminal, or wireless resources used for the transmission.

The controller 11 also manages the timing of receiving data from a terminal, or wireless resources used for the reception. The controller 11 further manages the timing of transmitting a notification signal, and wireless resources for the transmission.

The controller 11 determines that data is to be transmitted to a specific terminal, or a notification signal is to be transmitted to an unspecified number of terminals, and notifies information to be sent to a modulator/demodulator 12. The modulator/demodulator 12 performs signal modulation on the notified information, and transmits the modulated signal to a transmitter/receiver 13. Processing of modulating/demodulating the notified information by the modulator/demodulator 12 may be processing executed by a known wireless communication device.

The transmitter/receiver 13 performs digital-to-analog conversion on the received modulated signal, and up-converts the analog signal to a wireless frequency. The signal processed in the transmitter/receiver 13 is transmitted to the terminal from an antenna unit 14. The antenna unit 14 is controlled by the controller 11 so that a beam is directed to the direction of the terminal to which the information is to be sent. The processing of controlling the direction of the beam transmitted by the antenna unit 14 may be performed through use of the method described in, for example, Patent Literature 1.

When the controller 11 determines that data is to be received from a specific terminal, the antenna unit 14 is controlled by the controller 11 so that a beam is directed to the direction of the terminal from which data is to be sent. A signal received by the antenna unit 14 is transmitted to the transmitter/receiver 13.

The transmitter/receiver 13 down-converts the frequency of the received signal, performs analog-to-digital conversion on the down-converted signal, and transmits the digital signal to the modulator/demodulator 12. The modulator/demodulator 12 demodulates the signal, and sends the demodulated data to the controller 11.

The controller 11 puts the received data on the network. When the received data is a handover request from a terminal, the controller 11 analyzes measurement results received along with the data as results of measuring notification signals of nearby base stations.

When receiving a handover request, the base station uses the controller 11 to determine a nearby base station suitable as a handover destination based on the results of measuring notification signals received from the terminal, and makes a handover request to the determined nearby base station. At this time, the base station also notifies of information on the beam direction specified by the terminal. This information is, for example, a beam ID assigned to the notification signal by the nearby base station to distinguish between beams, and is notified to the base station by the terminal together with a handover request. Further, the base station notifies of information on, for example, the ID of the terminal for handover together with the handover request.

The base station receives a response from the nearby base station, uses the controller 11 to create a handover execution command, and instructs, via the modulator/demodulator 12, the transmitter/receiver 13, and the antenna unit 14, the terminal that has requested handover to execute handover.

This handover execution instruction contains the ID of the handover destination base station and timing information on a timing at which the terminal transmits a RACH signal, which is determined by the nearby base station in advance or determined every time the nearby base station performs a handover operation.

Meanwhile, the nearby base station receives the handover request, and, based on information about a beam direction notified along with the handover request, waits for the reception of a RACH signal of the terminal to be handed over at RACH reception timing of a beam direction group in which the notified beam direction is included. The beam direction in this case is controlled by the operation described above with reference to FIG. 1 to FIG. 3.

That is, the nearby base station receives the handover request, and waits for a RACH signal by adding a further outer beam direction when the notified beam direction is along the edge of the service area formed at the time of transmission of a notification signal, and waits for a RACH signal by using the same beam direction as that at the time of transmission of a notification signal without adding an outer beam direction when the notified beam direction is not along the edge of the service area.

The controller 11 of the nearby base station that is now the handover destination controls the beam direction of the antenna unit 14 at the RACH signal reception timing. A RACH signal detector 15 executes RACH signal detection operation for a signal input via the transmitter/receiver 13. When a RACH signal is detected, the RACH signal detector 15 notifies the controller 11 of the detection of a RACH signal.

The controller 11 receives the notification about the detection of a RACH signal, generates a random access response, and returns the random access response to the terminal via the modulator/demodulator 12, the transmitter/receiver 13, and the antenna unit 14.

Figure 5:
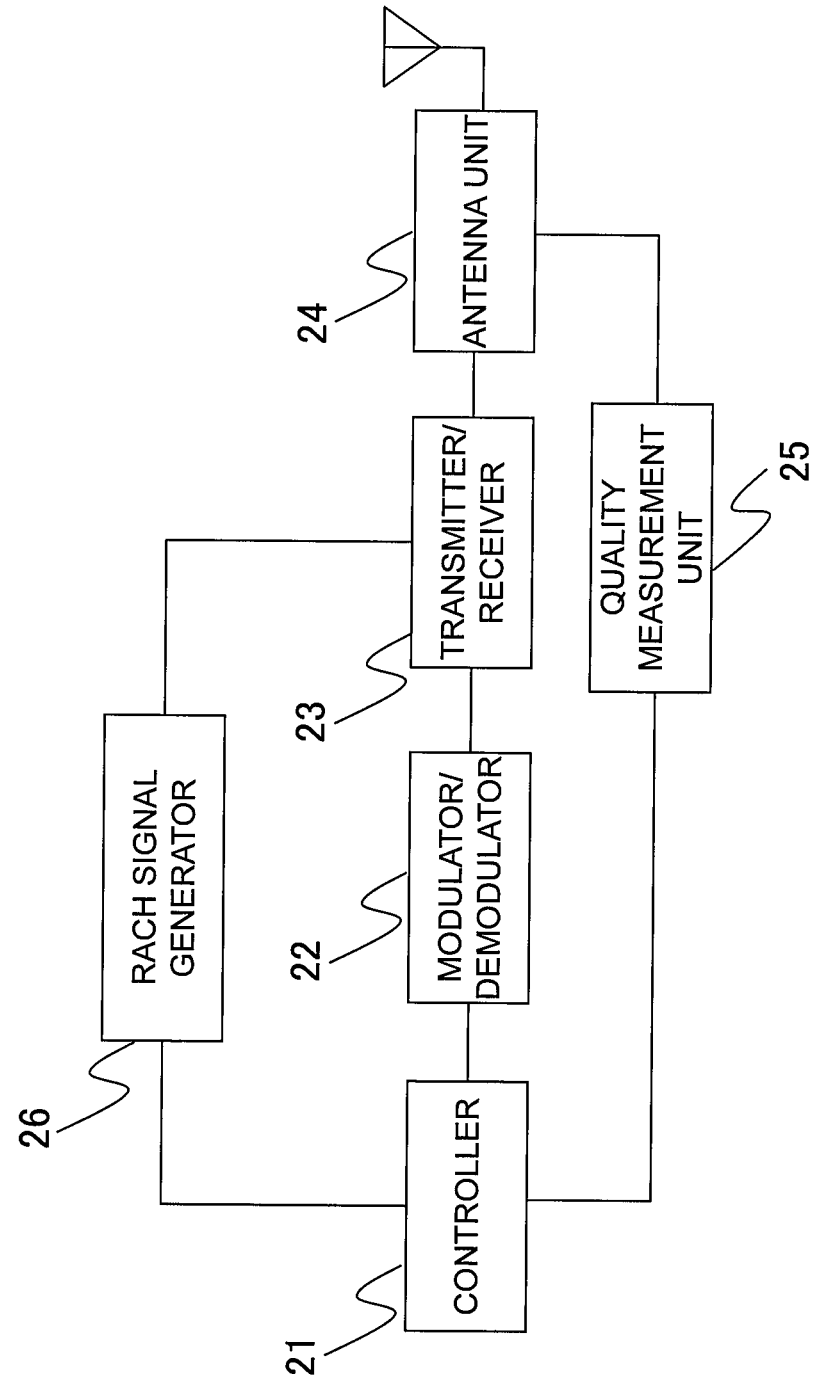
FIG. 5 is a diagram for illustrating a configuration of a terminal according to the first embodiment of the present invention.

FIG. 5 is a diagram for illustrating a configuration of a terminal according to the first embodiment of the present invention. During communication, a controller 21 detects data generated in the terminal, and uses wireless resources allocated by a base station to transmit the detected data to a modulator/demodulator 22 at transmission timing assigned by the base station. The modulator/demodulator 22 performs signal modulation on the received data, and transmits the modulated signal to a transmitter/receiver 23.

The transmitter/receiver 23 performs digital-to-analog conversion on the received modulated signal, and up-converts the analog signal to a wireless frequency. The signal processed in the transmitter/receiver 23 is transmitted from an antenna unit 24 to the base station.

To receive a signal, the terminal puts the controller 21, the modulator/demodulator 22, the transmitter/receiver 23, and the antenna unit 24 into operation so that a signal destined to the terminal can be received and demodulated any time. When it is confirmed that a message destined to the terminal is contained in a signal, the terminal processes the message as self-destined data.

At this time, a quality measurement device 25 measures the level of reception power, or a signal-to-interference plus noise ratio (SINR), of the signal carrying the self-destined data or of a notification signal, and reports the result of the measurement to the controller 21.

The controller 21 receives the report, and determines that the quality is deteriorated when the measurement value is lower than a predetermined threshold value. The controller 21 instructs the quality measurement unit 25 to measure a notification signal of a nearby base station.

The quality measurement unit 25 receives the instruction to measure a notification signal of a nearby base station, and reports the result of the measurement to the controller 21. The controller 21 receives the measurement result of the nearby base station, identifies a beam direction that is determined to be appropriate for communication for each nearby base station serving as a connection candidate, includes the measurement result and the identification result in a message requesting handover, and transmits the message to the current communication partner base station through the modulator/demodulator 22, the transmitter/receiver 23, and the antenna unit 24. The beam direction can be specified by the base station assigning, when using a plurality of beams to transmit notification signals, a beam ID to the notification signal of each beam, for example, and by the terminal selecting a beam having a highest received power level or SINR. The handover request message may include the beam ID as the identification result.

When a handover execution command is contained in self-destined data received from the base station, the terminal uses the notified information to transmit a RACH signal to the handover destination base station at RACH signal transmission timing. To that end, the controller 21 instructs a RACH signal generator 26 to generate a RACH signal.

The generated RACH signal is transmitted to the handover destination base station through the transmitter/receiver 23 and the antenna unit 24. After the RACH signal is transmitted, the controller 21 executes the operation of detecting a random access response in the demodulated data, which is received from the modulator/demodulator 22.

Figure 6:
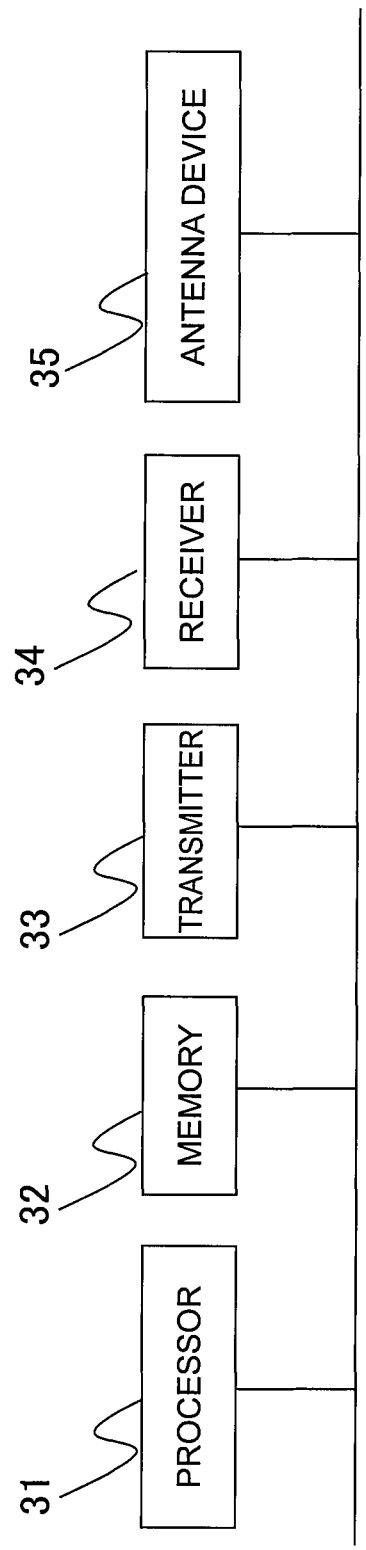
FIG. 6 is a diagram for illustrating an example of a hardware configuration by which the base station and the terminal according to the first embodiment of the present invention are implemented.

FIG. 6 is a diagram for illustrating an example of a hardware configuration by which the base station and the terminal according to the first embodiment of the present invention are implemented. The base station illustrated in FIG. 4 is implemented by, for example, a processor 31, a memory 32, a transmitter 33, a receiver 34, and an antenna device 35.

The processor 31 is a central processing unit (CPU: also called a processing device, an arithmetic device, a microprocessor, a microcomputer, a processor, or a DSP), a system large scale integration (LSI) chip, or the like.

The memory 32 is a non-volatile or volatile semiconductor memory, for example, a random access memory (RAM), a read-only memory (ROM), a flash memory, an erasable programmable read-only memory (EPROM), or an electrically erasable programmable read-only memory (EEPROM), a magnetic disk, a flexible disk, an optical disc, a compact disc, a mini disc, a digital versatile disc (DVD), or the like.

The controller 11, the modulator/demodulator 12, and the RACH signal detector 15 in the base station are implemented by the processor 31 and by a program stored in the memory 32. Specifically, the controller 11, the modulator/demodulator 12, and the RACH signal detector 15 are implemented by the processor 31 by reading out of the memory 32 a program that dictates the operation of the controller 11, the modulator/demodulator 12, and the RACH signal detector 15, and executing the program.

The transmitter/receiver 13 is implemented by the transmitter 33 and the receiver 34. Specifically, transmission processing in the transmitter/receiver 13 is executed by the transmitter 33, and reception processing in the transmitter/receiver 13 is executed by the receiver 34. The antenna unit 14 is implemented by the antenna device 35.

The controller 21, the modulator/demodulator 22, and the RACH signal generator 26 in the terminal, which are illustrated in FIG. 5, are implemented by the processor 31 and by a program stored in the memory 32. Specifically, the controller 21, the modulator/demodulator 22, and the RACH signal generator 26 are implemented by the processor 31 by reading out of the memory 32 a program that dictates the operation of the controller 21, the modulator/demodulator 22, and the RACH signal generator 26.

The transmitter/receiver 23 is implemented by the transmitter 33 and the receiver 34. Specifically, transmission processing in the transmitter/receiver 23 is executed by the transmitter 33, and reception processing in the transmitter/receiver 23 is executed by the receiver 34. The quality measurement unit 25 is also implemented by the receiver 34. The antenna unit 24 is implemented by the antenna device 35.

In the above description, the terminal has been described as identifying an appropriate beam direction. However, the terminal may report only the measurement result to the communication base station, and the communication base station or the handover destination base station may identify the beam direction. For example, the terminal may include information on the IDs, received power levels, and SINRs for all the measured beams in the message of the handover request, the communication base station or the handover destination base station may identify the beam direction based on a certain selection criterion. The certain selection criterion is considered to be, for example, selecting a beam having a highest received power level or SINR.

In FIG. 1, 12 beam directions are illustrated as being combined at the same time at the time of transmission of a notification signal. In this case, the maximum number of beams that can be formed at the same time as the apparatus capacity of the base station antenna is assumed to be 16, and a number of beam directions that is smaller than the maximum beam number are combined at the time of transmission of a notification signal.

Figure 7A:
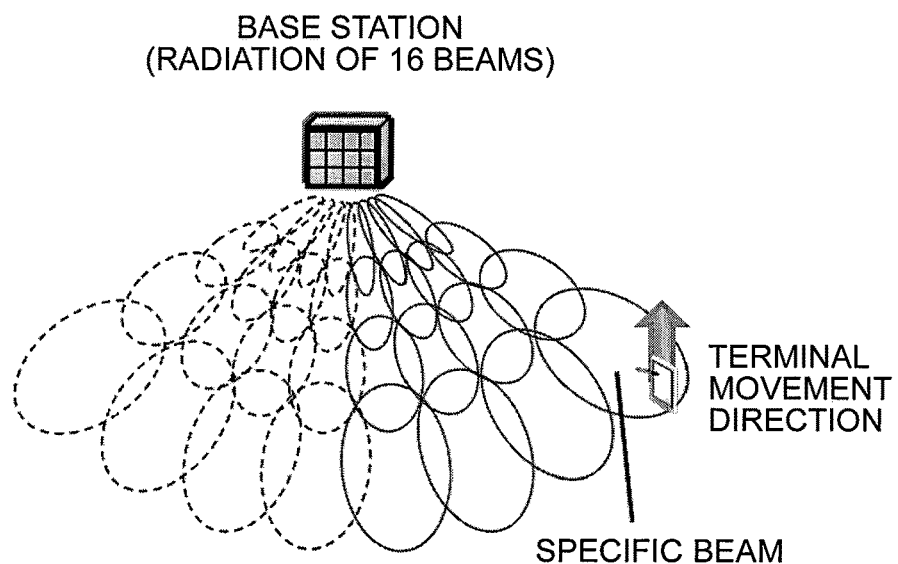
FIG. 7A is a diagram for illustrating a beam direction group at a time when the base station transmits the notification signal as a combination of beam directions corresponding to a maximum apparatus capacity in the first embodiment of the present invention.

Meanwhile, unlike the case of FIG. 1, a method of setting the number of combining beam directions at the same time at the time of transmission of a notification signal as 16, which is the maximum apparatus capacity, is conceivable. FIG. 7A is a diagram for illustrating a beam direction group at a time when the base station transmits the notification signal as a combination of beam directions corresponding to the maximum apparatus capacity in the first embodiment of the present invention. Further, FIG. 7B is a diagram for illustrating a beam direction group at a time when the base station receives the RACH signal after transmission of the notification signal as illustrated in FIG. 7A in the first embodiment of the present invention.

As can be seen from FIG. 7A, the beam direction group is formed based on the assumption that the number of beams at the time of transmission of a notification signal is 16, which corresponds to the maximum transmission capacity.

Figure 7B:
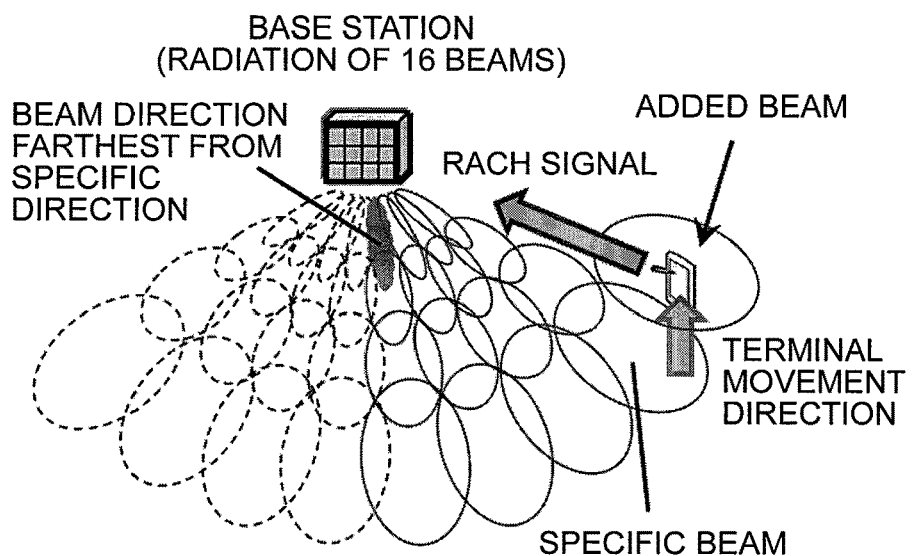
FIG. 7B is a diagram for illustrating a beam direction group at a time when the base station receives the RACH signal after transmission of the notification signal as illustrated in FIG. 7A in the first embodiment of the present invention.

As illustrated in FIG. 7B, the beam direction group at the time of reception of a RACH signal is formed as a beam direction group in which a further outer beam direction than the beam directions at the time of transmission of a notification signal is added and 16 beams corresponding to the maximum transmission capacity are prepared.

At this time, in exchange for adding one outer additional beam, as illustrated as a beam method hatched in FIG. 7B, one beam direction close to the base station antenna is excluded from the beam direction group. As a result, the beam direction group of FIG. 7B can be formed as 16 beam directions corresponding to the maximum transmission capacity.

In other words, a case in which the number of beams that can be formed at the same time is restricted to 16, which corresponds to the maximum transmission capacity, is considered. In this case, in exchange for adding an outer beam direction, another beam direction is required to be excluded from the group. Thus, considering reduction of an influence on reception of a RACH signal by the base station, a beam geometrically farthest from a specific beam that is determined to be appropriate for connection by the terminal is excluded from the group.

In FIG. 7, one outer beam is added as an additional beam. However, two or more outer beams can be added. In that case, beams corresponding to the number of added beams in the direction farthest from the specific beam are excluded.

The number of 12 or 16 described herein is merely an example. The gist of the invention is whether to set the number of beam directions at the time of transmission of a notification signal and the number of beam directions at the time of reception of a RACH signal to be different or the same.

As an example, the following method can be adopted in order to identify a beam geometrically farthest from the above-mentioned specific beam. First, a location on the ground to which each beam is radiated in a direction of obtaining the maximum gain thereof is acquired. Then, a beam irradiating a location having the largest straight-line distance from a location to which a specific beam is radiated is set to be a beam geometrically farthest from the specific beam.

Alternatively, instead of the geometrical distance, a beam having the lowest received power as a result of the terminal measuring notification signals can be considered to be a beam to be excluded.

Further, when the above-mentioned "beam geometrically farthest" or "beam having the lowest received power" is set as an indicator, there may be a case in which the number of beam directions serving as candidates to be excluded from the beam direction group used for reception of a RACH signal is larger than the number of directions required to be excluded, due to the fact that there are a plurality of beam directions having the same value of an indicator. In such a case, whether there is other communication terminals can be added to a determination criterion for identifying the beam to be excluded.

Figure 8:
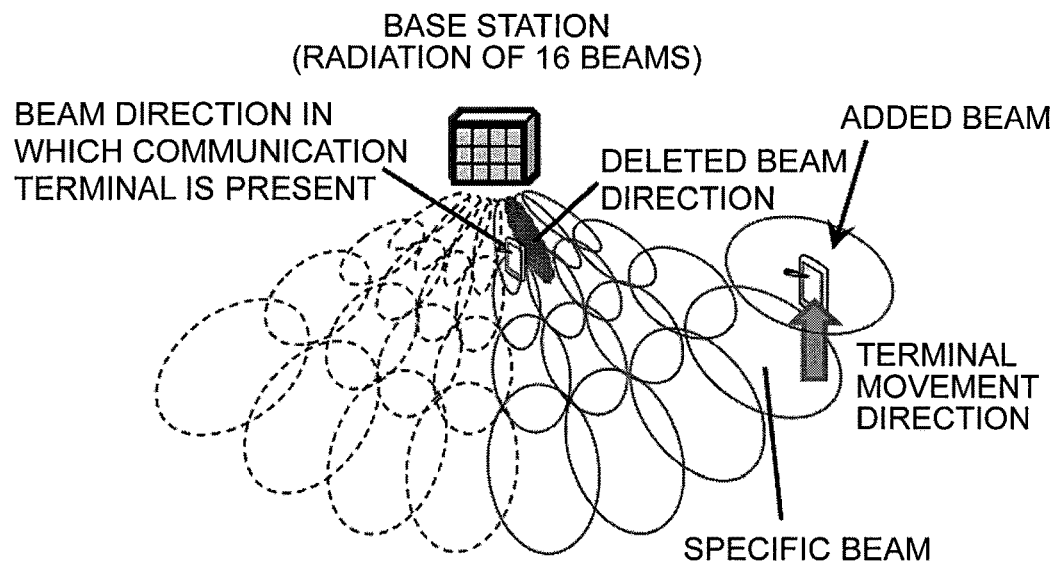
FIG. 8 is a diagram for illustrating a beam direction group at the time of reception of the RACH signal, which has been formed by identifying a beam to be excluded in consideration of existence of other communication terminals, in the first embodiment of the present invention.

FIG. 8 is a diagram for illustrating a beam direction group at the time of reception of the RACH signal, which has been formed by identifying the beam to be excluded in consideration of existence of other communication terminals in the first embodiment of the present invention. Now, it is assumed that, when the "beam having the lowest received power" is set as the indicator, two directions, namely, a "beam direction in which there is another communication terminal" and a "beam direction to be deleted" have the same low value of received power, and are thus selected as candidates to be excluded from the group.

In this case, the "beam direction in which there is another communication terminal" corresponds to the "beam geometrically farthest", and there is another communication terminal in that direction. On the other hand, there is no communication terminal in the "beam direction to be deleted". Thus, in the example of FIG. 8, the "beam direction to be deleted" is finally excluded from the group.

With such a configuration, the "beam direction in which there is another communication terminal" is used not only for reception of a RACH signal, but also for maintaining communication to and from another communication terminal by using frequency resources other than a frequency resource for arrangement of the RACH signal.

Figure 9:
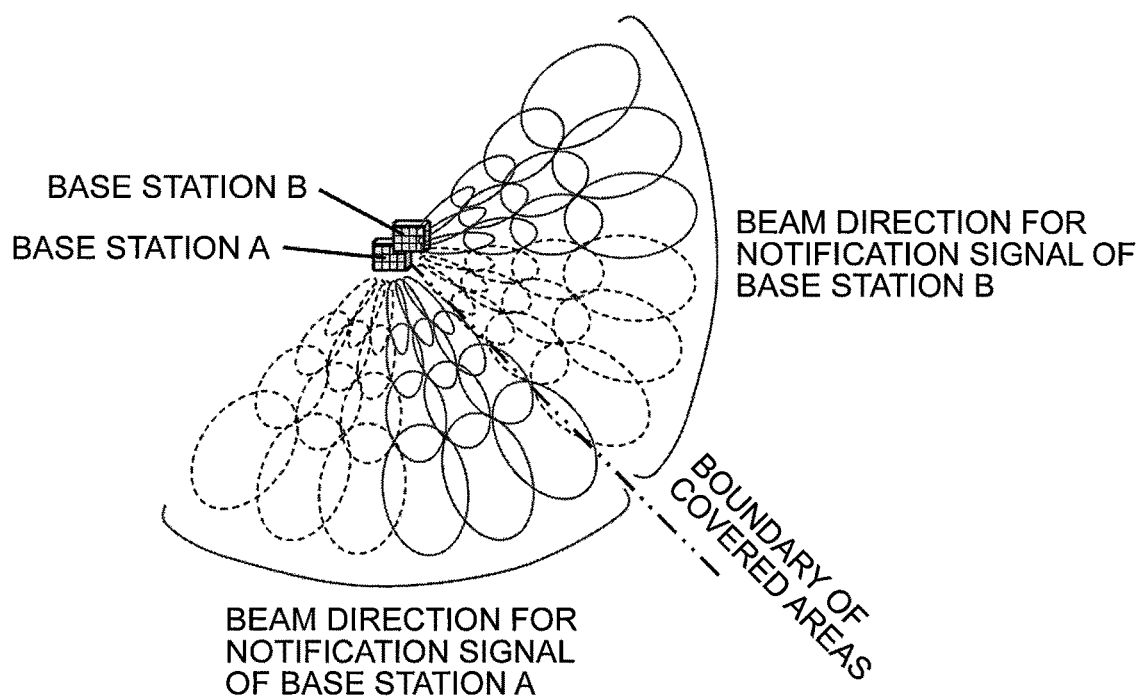
FIG. 9 is a diagram for illustrating a relationship between beam arrangements of adjacent base stations in the first embodiment of the present invention.

FIG. 9 is a diagram for illustrating a relationship between beam arrangements of adjacent base stations in the first embodiment of the present invention. As illustrated in FIG. 9, respective covered areas of two base stations A and B are arranged so as to be in contact with each other at the time of determination of beams for transmission of a notification signal.

The beam direction to be added at the time of reception of a RACH signal is not considered. Through adoption of such an arrangement, when the terminal performs measurement to search for and connect to a base station, there is no hole in the covered area and it is possible to accurately detect the base station to be connected and the beam.

Figure 10:
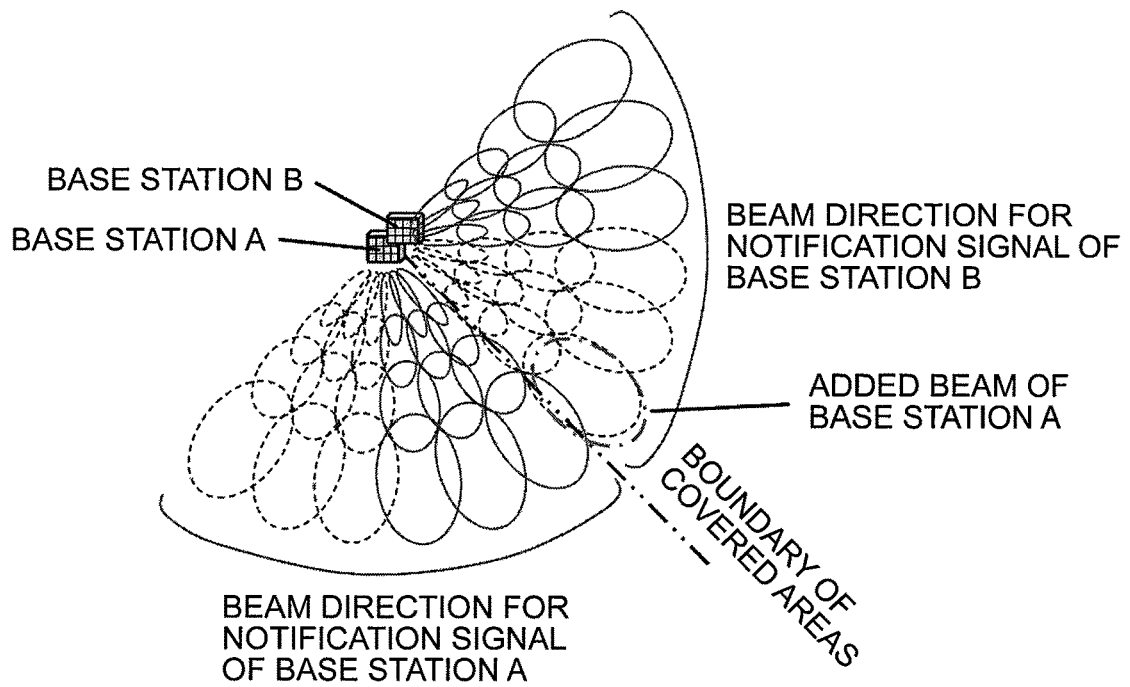
FIG. 10 is a diagram for illustrating the relationship between beam arrangements of adjacent base stations in addition to a beam direction to be added at the time of reception of the RACH signal in the first embodiment of the present invention.
Figure 11:
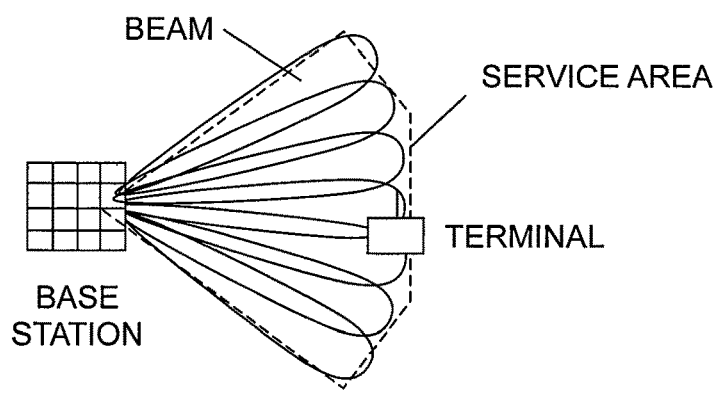
FIG. 11 is an explanatory diagram about a base station whose service area is established with the use of a plurality of beam directions.
Figure 12:
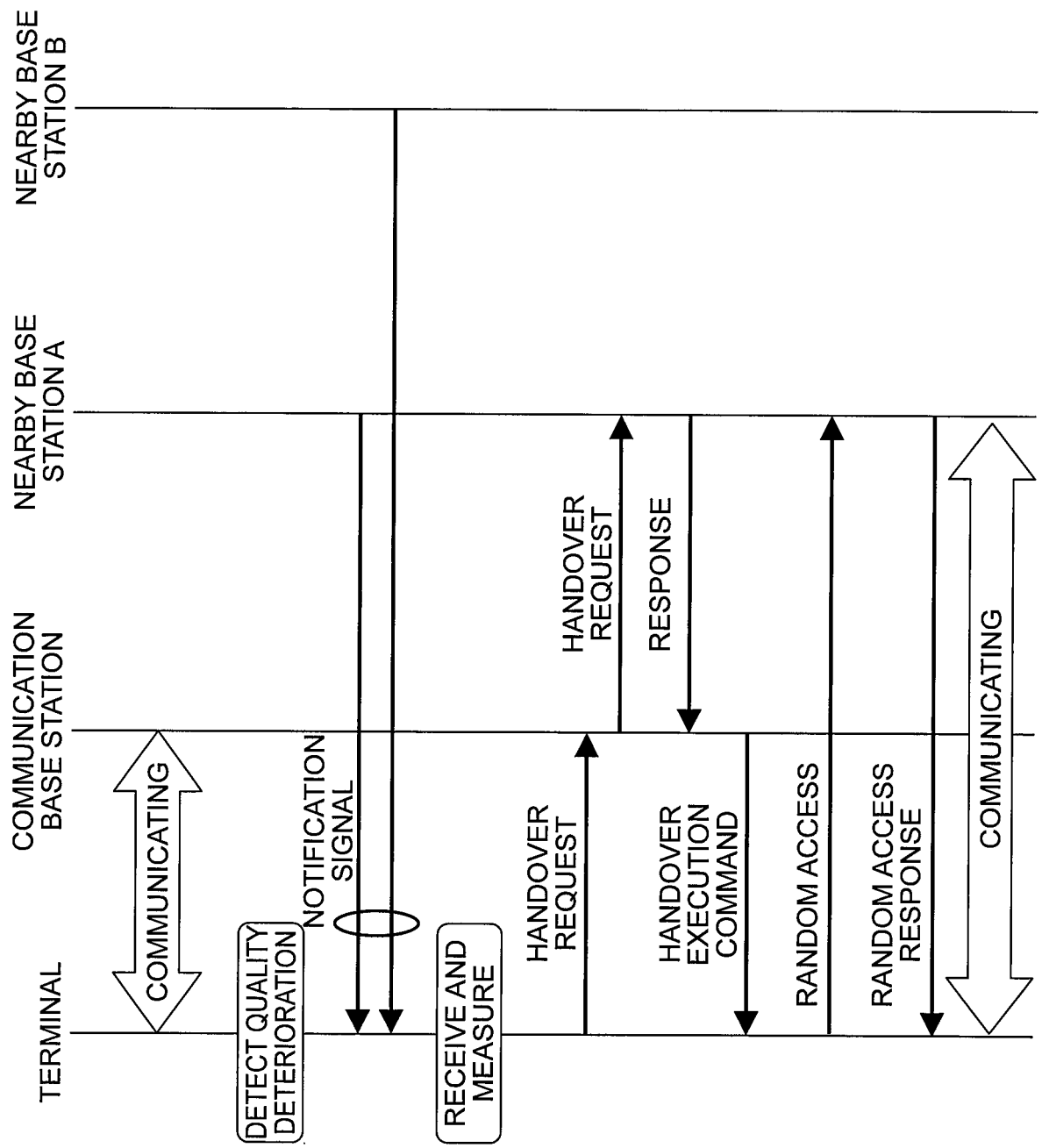
FIG. 12 is an explanatory diagram for illustrating a signal sequence of general handover in a wireless communication system in which beam forming is not used.
Figure 13:
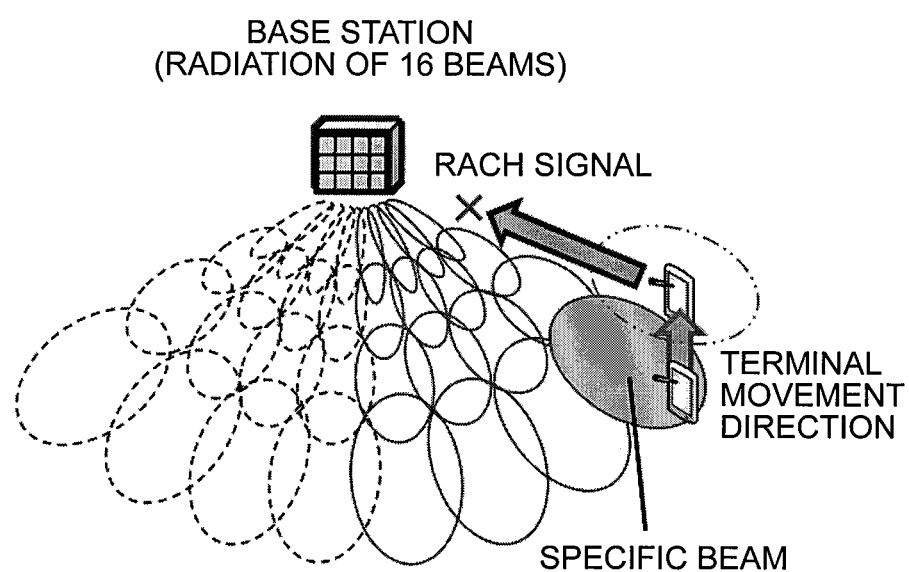
FIG. 13 is a diagram for illustrating a base station capable of radiating beams in 16 beam directions at the same time by covering the service area with 32 beam directions.

FIG. 10 is a diagram for illustrating the relationship between beam arrangements of adjacent base stations in addition to a beam direction to be added at the time of reception of the RACH signal in the first embodiment of the present invention. Specifically, in FIG. 10, a beam direction to be added at the time of reception of a RACH signal is also added in addition to the beam direction at the time of transmission of a notification signal illustrated in FIG. 9.

The beam direction illustrated as an ellipse of the long dashed short dashed line in FIG. 10 is a beam direction to be added at the time of reception of a RACH signal by the base station A. As can be seen from FIG. 10, the beam direction to be added by the base station A overlaps with the beam direction in which the adjacent base station B transmits a notification signal.

The beam direction in which a notification signal is transmitted is not only used for transmission of the notification signal, but also for normal communication. Thus, when the base station A uses an additional beam to receive a RACH signal and a terminal communicating to and from the base station B transmits a communication signal, the communication signal and the RACH signal may interfere with each other, and those signals may not be correctly received.

In view of this, in the present invention, at a timing of reception of a RACH signal by a certain base station, the adjacent base station adopts a method of avoiding giving a resource for communication to a communication terminal present in a beam direction of the adjacent base station, which overlaps with a beam direction in which there is a terminal that transmits a RACH signal. In order to implement such a method, the base station that receives a RACH signal notifies the adjacent base station of information on an additional beam to be used at the time of reception of the RACH signal.

The information on an additional beam may be geometrical information such as longitude or latitude, or may be angle information as viewed from the own base station. Further, when a mapping table indicating the geometrical information or angle information by a number is shared among the adjacent base stations in advance, it suffices that only the number is notified at the time of reception of a RACH signal. The adjacent base station can use the notified number and mapping table to acquire the geometrical information or angle information on an additional beam.

The base station apparatus that performs this operation can be implemented by the same configuration as that illustrated in FIG. 4. The controller 11 of the base station that receives a RACH signal uses the interface of another base station to notify the adjacent base station of the information on an additional beam. Further, the controller 11 also notifies the adjacent base station of information on the timing of receiving a RACH signal.

The controller 11 of the adjacent base station receives the information on an additional beam for reception of a RACH signal, and identifies a beam direction of the own base station overlapping with that beam direction from the information on an additional beam. Further, the controller 11 of the adjacent base station uses the information on a timing of receiving a RACH signal, which has been notified at the same time, and performs scheduling so as not to give a communication resource to a terminal present in the specific beam direction of the own base station at that timing.

At this time, when the resource to be used for reception of a RACH signal is only the limited region on a frequency domain, the adjacent base station may perform scheduling so as not to avoid use of all the resources on the frequency domain, but to avoid use of only the frequency resource to be used for reception of a RACH signal. In this case, the base station that receives a RACH signal also notifies the adjacent base station of information on the frequency resource to be used for reception of a RACH signal.

In the above description, when a certain base station receives a RACH signal, the adjacent base station performs control of receiving the information on a beam to be added, and avoiding allocation of a resource to a terminal present in the beam direction of the own base station overlapping with the notified beam direction.

However, even when the beam directions do not overlap with each other, the adjacent base station may perform control of avoiding allocation of a resource at the same timing as reception of a RACH signal for all the terminals present in a beam near the boundary of the covered area of a certain base station. The terminals present in the beam near the boundary of the covered area may interfere with the adjacent base station. Thus, the adjacent base station can perform such control as to avoid the interference as much as possible. This control is also implemented when the adjacent base station receives the information on an additional beam from the base station that receives a RACH signal.

In the above, the method of avoiding an interference at the time of reception of a RACH signal has been described. However, when the beam direction added at the time of reception of a RACH signal is used even after completion of a connection operation with the RACH signal and transition of the terminal to a communication state, an operation of always exchanging allocation of a resource is required in order to avoid an interference with the adjacent base station. Thus, it is effective for the terminal that has finished a connection operation by using an additional beam to be handed over to the adjacent base station after transition to the communication state.

As one method of causing handover of the terminal, it is conceivable that the base station does not use the additional beam direction after transition to the communication state and selects and uses the beam direction that has been used at the time of transmission of a notification signal. With this, the gain of a beam decreases in the terminal direction, and thus the terminal determines that the communication quality is low, resulting in a handover request.

In other cases, as another method of causing handover of the terminal, it is conceivable that the base station reduces transmission power although the base station uses an additional beam. Also in this case, the terminal determines that the communication quality is low, and a handover request occurs.

Further, as another method of causing handover of the terminal, it is conceivable that the base station notifies the terminal of a threshold value for causing a handover request as a value higher than a normal value, to thereby change the setting so as to increase the threshold value. The terminal compares the set threshold value with the measured communication quality, and when the quality becomes lower than the threshold value, starts an operation of measuring a signal of the nearby base station. Then, when abase station that is likely to provide abetter communication quality is detected, the terminal issues a handover request. Thus, when this threshold value is set to a higher value, the terminal is more likely to issue a handover request.

The base station device that performs this operation can be implemented by the same configuration as that illustrated in FIG. 4. The controller 11 can cause a subject terminal to be more likely to be handed over by selecting a beam direction used for communication to and from the subject terminal, setting the transmission power of a beam to a value lower than a normal value, or notifying the subject terminal of a threshold value higher than a normal value.

In the above, a description has been given on the assumption that the base station includes the controller 11 configured to, for example, determine the beam direction group or the beam direction. However, the base station may be further divided into two apparatus. For example, in the example of FIG. 4, it is conceivable that the two-apparatus configuration is obtained by setting the modulator/demodulator 12, the transmitter/receiver 13, the antenna unit 14, and the RACH signal detector 15 as one apparatus and setting the controller 11 as the other apparatus.

Alternatively, as another configuration, it is conceivable that the two-apparatus configuration is obtained by setting the transmitter/receiver 13 and the antenna unit 14 as one apparatus and setting the controller 11, the modulator/demodulator 12, and the RACH signal detector 15 as the other apparatus.

Alternatively, as another configuration, it is conceivable that the two-apparatus configuration is obtained by separately providing a control station having a communication interface with a plurality of base stations in order to easily implement cooperation among the plurality of base stations and installing the controller 11 in the control station.

Then, the controller 11 in the first embodiment can have the above-mentioned function in any apparatus configuration without depending on the various apparatus configurations as described above.

The first embodiment includes a configuration that enables the beam directions, which are used when the base station receives a RACH signal by a plurality of beams, to include the beam direction used at the time of transmission of a notification signal and a further outer beam direction.

As a result, the base station can reliably receive a RACH signal even when a beam direction that is determined to be appropriate after reception of a notification signal by the terminal is an outmost beam direction among the beam directions used for transmission of a notification signal, and the terminal has moved out of the beam direction that is determined to be appropriate before transmission of a RACH signal.

Further, the base station according to the first embodiment is configured to exclude, when a further outer beam direction than the beam directions at the time of transmission of a notification signal is added to the beam direction group at the time of reception of a RACH signal, a beam direction geometrically farthest from the beam determined to be appropriate for connection by the terminal or the beam direction having the lowest received power measured by the terminal from the beam direction group at the time of reception of a RACH signal.

As a result, even when there is a limitation on the number of beams to be formed at the same time, it is possible to add an outer beam direction while maintaining the performance of receiving a RACH signal.

Further, the first embodiment includes a configuration of setting the respective beam arrangements of two adjacent base stations so that the covered areas of those beam arrangements are in contact with each other when a transmission beam of the notification signal is arranged.

As a result, at the time of measurement for searching for a base station to be connected, a hole is not opened in the covered area and the terminal can accurately detect the base station to be connected and the beam.

Further, the base station according to the first embodiment includes a configuration of notifying, when a further outer beam direction than the beam directions at the time of transmission of a notification signal is added to the beam direction group for reception of a RACH signal, the adjacent base station of the information on the beam direction to be added and the timing of receiving the RACH signal.

Meanwhile, the adjacent base station according to the first embodiment is configured to avoid giving a communication resource to a terminal present in the beam direction of the own base station overlapping with the beam direction to be added at the timing of receiving a RACH signal. Alternatively, the adjacent base station according to the first embodiment is configured to avoid giving a communication resource to a terminal present in the beam direction near the boundary of the covered area. As a result, it is possible to avoid an interference between a RACH signal and a communication signal of the adjacent base station.

Further, the base station according to the first embodiment is configured to set a terminal that has finished a connection operation with a RACH signal by using an additional beam and transitioned to the communication state, to a state of being likely to issue a handover request. Specifically, the base station can be configured not to use an additional beam for communication to and from this terminal. Further, the base station is configured to set, also when an additional beam is used for communication to and from the terminal, the transmission power due to the additional beam to a lower value, or set the threshold value used by the terminal for handover to a higher value.

As a result, it is possible to avoid an interference with the adjacent base station or a complicated operation of exchanging resources with each other.

The invention claimed is:

1. A beam transmission/reception method, which is executed in a wireless communication system in which a terminal and a base station are configured to use a beam to communicate to and from each other,
   the beam transmission/reception method comprising a first step of:
   determining, by the base station, when receiving a random access signal transmitted by the terminal as a connection request, a necessity to add a further outer beam direction to beam directions used at a time of transmission of a notification signal for measuring a signal before the reception, based on whether a beam direction specified by the terminal is notified in advance and on whether the beam direction specified by the terminal is along an edge of a service area; and
   setting a beam direction group at a time of reception of the random access signal by adding the further outer beam direction when determining that the necessity is present.

2. The beam transmission/reception method according to claim 1, further comprising a second step of excluding, by the base station, from the beam direction group at the time of reception of the random access signal set in the first step, a beam direction geometrically farthest from a beam direction determined to be appropriate for connection by the terminal, or a beam direction having a lowest received power measured by the terminal, among the beam directions used at the time of transmission of the notification signal.

3. The beam transmission/reception method according to claim 1, further comprising a third step of setting, by the base station, when an adjacent base station is present, an own covered area at a time of arrangement of a transmission beam of the notification signal so that the own covered area is in contact with a covered area of the transmission beam of the notification signal of the adjacent base station.

4. The beam transmission/reception method according to claim 1,
   wherein the base station includes a communication base station communicating to and from the terminal and an adjacent base station adjacent to the communication base station, and
   wherein the beam transmission/reception method further comprises:
   a fourth step of acquiring, by the communication base station, from the adjacent base station, when the adjacent base station has added the further outer beam direction to set the beam direction group at the time of reception of the random access signal in the first step, first information on the added further outer beam direction and second information on a timing of receiving the random access signal; and
   a fifth step of avoiding, by the communication base station, when receiving the first information and the second information from the adjacent base station, giving a communication resource to a terminal present in a beam direction of the communication base station overlapping with the added further outer beam direction contained in the first information, or avoiding giving a communication resource to a terminal present in a beam direction arranged in a boundary of a covered area, at the timing of receiving the random access signal contained in the second information.

5. The beam transmission/reception method according to claim 1, further comprising:
   a sixth step of finishing, by the base station, a connection operation due to the reception of the random access signal after setting the beam direction group by adding the further outer beam direction in the first step; and
   a seventh step of communicating, by the base station, to and from the terminal, which has transitioned to a communication state, without using the further outer beam direction added in the first step, after finishing the connection operation in the sixth step.

6. The beam transmission/reception method according to claim 1, further comprising:
   a sixth step of finishing, by the base station, a connection operation due to the reception of the random access signal after setting the beam direction group by adding the further outer beam direction in the first step; and
   an eighth step of setting, by the base station, a transmission power of communication using the further outer beam direction added in the first step to be lower, or setting a threshold value for handover, which is set in the terminal, to be higher than a normal value, after completion of the connection operation in the sixth step and at a time of communication to and from the terminal, which has transitioned to a communication state, using the further outer beam direction.

7. A base station, which is applied to a wireless communication system in which a beam is used for communication to and from a terminal,
the base station comprising a controller configured to perform beam direction control by:
determining, when receiving a random access signal transmitted by the terminal as a connection request, a necessity to add a further outer beam direction to beam directions used at a time of transmission of a notification signal for measuring a signal before the reception, based on whether a beam direction specified by the terminal is notified in advance and on whether the beam direction specified by the terminal is along an edge of a service area; and
setting a beam direction group at a time of reception of the random access signal by adding the further outer beam direction when determining that the necessity is present.

8. The base station according to claim 7, wherein the controller is configured to receive third information on a beam direction determined to be appropriate for connection from the terminal having received the notification signal, and exclude, from the beam direction group, when setting the beam direction group at the time of reception of the random access signal, a beam direction geometrically farthest from the beam direction determined to be appropriate for connection by the terminal, which is contained in the third information, among the beam directions used at the time of transmission of the notification signal.

9. The base station according to claim 7, wherein the controller is configured to receive, from the terminal having received the notification signal, fourth information on a beam direction having a lowest received power among received powers of respective beam directions measured by the terminal, and exclude, from the beam direction group, when setting the beam direction group at the time of reception of the random access signal, the beam direction having the lowest received power contained in the fourth information among the beam directions used at the time of transmission of the notification signal.

10. A terminal, which is applied to a wireless communication system in which a beam is used for communication to and from the base station of claim 9,
the terminal comprising a controller configured to identify, when receiving the notification signal contained in one or more beam directions from the base station, a beam direction having a lowest received power among received powers of respective beam directions measured by the terminal to generate the fourth information, and transmit the fourth information to the base station.

11. The base station according to claim 7,
wherein the base station includes a communication base station communicating to and from the terminal and an adjacent base station adjacent to the communication base station, and
wherein respective controllers of the communication base station and the adjacent base station exchange information with each other for own covered areas at a time of arrangement of transmission beams of the notification signal, to thereby set the own covered areas so that the own covered areas are in contact with each other.

12. The base station according to claim 7,
wherein the base station includes a communication base station communicating to and from the terminal and an adjacent base station adjacent to the communication base station,
wherein a controller of the adjacent base station is configured to notify, when setting the beam direction group at the time of reception of the random access signal, the communication base station of first information on the added further outer beam direction and second information on a timing of receiving the random access signal, and
wherein a controller of the communication base station is configured to avoid, when receiving the first information and the second information from the adjacent base station, giving a communication resource to a terminal present in a beam direction of the communication base station overlapping with the added further outer beam direction contained in the first information, or avoid giving a communication resource to a terminal present in a beam direction arranged in a boundary of a covered area, at the timing of receiving the random access signal contained in the second information.

13. The base station according to claim 7, wherein the controller is configured to set the beam direction group by adding the further outer beam direction, and communicate to and from the terminal, which transitioned to a communication state, without using the further outer beam direction after finishing a connection operation due to the reception of the random access signal.

14. The base station according to claim 7, wherein the controller is configured to set a transmission power of communication using the further outer beam direction to be lower, or set a threshold value for handover, which is set in the terminal, to be higher than a normal value, after setting the beam direction group by adding the further outer beam direction and finishing a connection operation due to the reception of the random access signal and at a time of communication to and from the terminal, which has transitioned to a communication state, using the further outer beam direction.

15. A terminal, which is applied to a wireless communication system in which a beam is used for communication to and from the base station of claim 14,
the terminal comprising a controller configured to variably set a threshold value for determining handover based on a threshold value set by the base station.

16. A wireless communication system, comprising a terminal and a base station, which are configured to use a beam to communicate to and from each other,
wherein the terminal is configured to, when the base station includes a communication base station communicating to and from the terminal and a nearby base station configured to serve as a handover destination candidate:
generate, when detecting deterioration in signal quality between the terminal and the communication base station, a handover request including a result of measuring a notification signal transmitted by the nearby base station, and notify the communication base station of the handover request; and
transmit, when receiving from the communication base station a handover execution command including information on the nearby base station serving as a handover destination as a response to the handover request, a random access signal serving as a connection request to the nearby base station serving as the handover destination, and wherein the nearby base station serving as the handover destination is configured to:

determine, when receiving the random access signal transmitted by the terminal, a necessity to add a further outer beam direction to beam directions used at a time of transmission of the notification signal before the reception, based on whether a beam direction specified by the terminal is notified in advance and on whether the beam direction specified by the terminal is along an edge of a service area; and set a beam direction group at a time of reception of the random access signal by adding the further outer beam direction when determining that the necessity is present.

* * * * *